United States Patent
Hynes et al.

(10) Patent No.: US 9,396,453 B2
(45) Date of Patent: Jul. 19, 2016

(54) WASTE MANAGEMENT SYSTEM FOR ASSOCIATING REFUSE BINS TO CORRESPONDING USERS

(75) Inventors: Eamon Hynes, Limerick (IE); James Martin, Limerick (IE)

(73) Assignee: ADVANCED MANUFACTURING CONTROL SYSTEM LTD., Co. Limerick (IE)

( * ) Notice: Subject to any disclaimer, the term of this patent is extended or adjusted under 35 U.S.C. 154(b) by 837 days.

(21) Appl. No.: 12/574,767

(22) Filed: Oct. 7, 2009

(65) Prior Publication Data

US 2010/0088203 A1 Apr. 8, 2010

(30) Foreign Application Priority Data

Oct. 7, 2008 (GB) ................................ 0818315.4

(51) Int. Cl.
| | |
|---|---|
| G07B 17/00 | (2006.01) |
| G07F 19/00 | (2006.01) |
| G04F 5/00 | (2006.01) |
| G06Q 10/08 | (2012.01) |
| B65F 1/14 | (2006.01) |
| G06Q 50/26 | (2012.01) |
| G06Q 40/00 | (2012.01) |

(52) U.S. Cl.
CPC ............. *G06Q 10/087* (2013.01); *B65F 1/1484* (2013.01); *G06Q 40/12* (2013.12); *G06Q 50/26* (2013.01); *B65F 2210/1125* (2013.01); *B65F 2210/128* (2013.01)

(58) Field of Classification Search
CPC .......... G06Q 30/0631; G06Q 30/0641; G06Q 30/0224; G06Q 30/0255; G06Q 10/00; G06Q 20/405; G06F 17/30554; G06F 2221/2117; G06F 17/00–17/03

USPC ............. 705/14.11, 14.17, 14.41, 51, 64, 67, 705/1.1, 308, 30, 400, 14.53; 177/139, 145; 700/305; 715/205, 716, 744, 202; 707/999.001–999.005
See application file for complete search history.

(56) References Cited

U.S. PATENT DOCUMENTS

| | | | | |
|---|---|---|---|---|
| 4,995,765 A * | 2/1991 | Tokuhiro | ................ | B65F 5/005 209/580 |
| 5,007,786 A * | 4/1991 | Bingman | ................ | B65F 3/001 414/409 |
| 5,014,206 A * | 5/1991 | Scribner | ................ | G07C 5/008 340/3.31 |
| 5,071,303 A * | 12/1991 | Carson | .................... | B65F 1/006 414/21 |
| 5,121,853 A * | 6/1992 | Edelhoff | ............... | B65F 1/1484 220/500 |

(Continued)

FOREIGN PATENT DOCUMENTS

JP 2006127037 5/2006

*Primary Examiner* — Olusegun Goyea
(74) *Attorney, Agent, or Firm* — Seyfarth Shaw LLP; Brian Michaelis

(57) ABSTRACT

A waste management system for associating a collected refuse bin with a corresponding user of that bin. The system comprises a GPS tracker unit on-board a collection vehicle for recording the GPS co-ordinates of each refuse bin during refuse collection therefrom by the collection vehicle. A central server is configured for communication with each of a plurality of collection vehicles so that the GPS co-ordinates of each refuse bin collected during a refuse collection may be communicated to the central server. The server is further configured to effect a datastore lookup for comparing the GPS co-ordinates of the collected refuse bins with pre-recorded geographical data of a plurality of users for associating each refuse bin to a corresponding user.

18 Claims, 1 Drawing Sheet

(56) References Cited

U.S. PATENT DOCUMENTS

| | | | | |
|---|---|---|---|---|
| 5,230,393 A * | 7/1993 | Mezey | B65F 3/08 | 177/139 |
| 5,326,939 A * | 7/1994 | Schafer | G06K 19/041 | 177/139 |
| 5,392,926 A * | 2/1995 | Schafer | B65F 1/122 | 209/546 |
| 5,416,706 A * | 5/1995 | Hagenbuch | G08G 1/20 | 177/136 |
| 5,565,846 A * | 10/1996 | Geiszler | B65F 1/1484 | 177/139 |
| 5,963,951 A * | 10/1999 | Collins | G06Q 10/10 | |
| 6,191,691 B1 * | 2/2001 | Serrault | B65F 1/1484 | 177/145 |
| 6,302,461 B1 * | 10/2001 | Debras | B65F 1/1484 | 177/139 |
| 6,448,898 B1 * | 9/2002 | Kasik | B65F 1/14 | 177/137 |
| 6,510,376 B2 * | 1/2003 | Burnstein | G06K 19/0723 | 701/117 |
| 6,983,883 B2 * | 1/2006 | Ridling | G01G 19/083 | 177/136 |
| 7,123,150 B2 * | 10/2006 | Mallett | B07C 7/005 | 209/583 |
| 7,246,009 B2 * | 7/2007 | Hamblen | G08G 1/20 | 340/988 |
| 7,483,946 B2 * | 1/2009 | Boyd | G06Q 10/109 | 709/203 |
| 7,501,951 B2 * | 3/2009 | Maruca | B65F 1/1484 | 340/572.1 |
| 7,511,611 B2 * | 3/2009 | Sabino | B65F 1/1484 | 340/500 |
| 7,870,042 B2 * | 1/2011 | Maruca | G06Q 10/06 | 209/509 |
| 7,917,438 B2 * | 3/2011 | Kenedy | G06Q 20/3674 | 705/51 |
| 7,949,557 B2 * | 5/2011 | Fitzgerald | G06Q 20/26 | 705/14.11 |
| 2002/0030595 A1 * | 3/2002 | Kasik | B65F 1/14 | 340/568.1 |
| 2003/0112155 A1 * | 6/2003 | Landre | B65F 1/1484 | 340/988 |
| 2003/0152206 A1 * | 8/2003 | Kawaguchi | H04Q 3/0029 | 379/201.01 |
| 2004/0059914 A1 * | 3/2004 | Karaoguz | G06Q 20/322 | 713/168 |
| 2005/0004983 A1 * | 1/2005 | Boyd | G06Q 10/109 | 709/204 |
| 2005/0038572 A1 * | 2/2005 | Krupowicz | B65F 1/1484 | 700/305 |
| 2005/0086257 A1 * | 4/2005 | Wright | G06Q 10/10 | |
| 2005/0131645 A1 * | 6/2005 | Panopoulos | B60P 1/5457 | 701/472 |
| 2006/0047379 A1 * | 3/2006 | Schullian | B61L 27/0077 | 701/19 |
| 2006/0080819 A1 * | 4/2006 | McAllister | G06K 17/00 | 29/403.3 |
| 2006/0218001 A1 * | 9/2006 | Mallett | B07C 7/005 | 209/702 |
| 2006/0218002 A1 * | 9/2006 | Mallett | B07C 7/005 | 209/583 |
| 2006/0259358 A1 * | 11/2006 | Robinson | G06Q 30/02 | 705/14.41 |
| 2007/0088603 A1 * | 4/2007 | Jouppi | G06Q 30/02 | 705/14.66 |
| 2007/0150745 A1 * | 6/2007 | Peirce | G06F 21/32 | 713/186 |
| 2007/0219862 A1 * | 9/2007 | Casella | B65F 1/1484 | 705/14.11 |
| 2007/0260466 A1 * | 11/2007 | Casella | B65F 1/1484 | 705/1.1 |
| 2007/0262878 A1 * | 11/2007 | Maruca et al. | | 340/686.1 |
| 2007/0268759 A1 * | 11/2007 | Sabino | B65F 1/1484 | 365/192 |
| 2008/0061977 A1 * | 3/2008 | Maruca | B65F 1/1484 | 340/572.1 |
| 2008/0077541 A1 * | 3/2008 | Scherer | G06Q 30/0283 | 705/400 |
| 2008/0088434 A1 * | 4/2008 | Frieder | G08B 21/12 | 340/539.11 |
| 2008/0101658 A1 * | 5/2008 | Ahern | G06F 21/32 | 382/115 |
| 2008/0208825 A1 * | 8/2008 | Curtis | G06F 7/00 | |
| 2008/0233918 A1 | 9/2008 | Pousti | | |
| 2009/0083090 A1 * | 3/2009 | Rolfes | G06Q 20/102 | 705/30 |
| 2009/0165022 A1 * | 6/2009 | Madsen | G06Q 10/109 | 719/318 |
| 2010/0063930 A1 * | 3/2010 | Kenedy | G06Q 20/3674 | 705/51 |
| 2010/0094863 A1 * | 4/2010 | Kenton-Dau | G06Q 30/02 | 707/722 |
| 2010/0328078 A1 * | 12/2010 | Light | G06Q 30/02 | 340/573.1 |
| 2011/0022659 A1 * | 1/2011 | Boyd | G06Q 10/109 | 709/204 |

* cited by examiner

WASTE MANAGEMENT SYSTEM FOR ASSOCIATING REFUSE BINS TO CORRESPONDING USERS

RELATED CASE INFORMATION

This application claims benefit of Great Britain Patent Application No. 0818315.4 filed on Oct. 7, 2008.

FIELD OF THE INVENTION

The present invention relates to a waste management system for associating at least one of a plurality of refuse bins with an appropriate user. In a preferred implementation such association may be effected during actual refuse collection. The present invention more particularly relates to a waste management system which records at least one parameter during refuse collection and compares the recorded parameter with pre-recorded data of registered users to identify the user.

BACKGROUND

Waste management systems are well known in the art. Collection vehicles may follow planned routes when collecting refuse from bins which are assigned to users or follow ad-hoc routes. It is known to charge per collection and also to charge per weight of refuse collected. If the latter arrangement is used, a weighing mechanism is provided on each collection vehicle for weighing the bins for determining the amount of refuse collected from each user. A billing system charges the user based on the weight of the refuse collected.

Bins are typically located along the side of the streets for facilitating collection by the collection vehicles. As a consequence it is difficult to know to whom the bins are registered. The waste collection company needs to know the user of each bin in order to charge the correct user for the amount of refuse collected. Incorporating electronic transponders, for example, RFID tags on each bin which store the identity of its registered user is known in the art. Computing devices are provided on the collection vehicles which are operable to read the RFID tags for identifying the users during refuse collection. However while this provides an accurate association of the actual bin with the appropriate owner or user the incorporating and maintaining of RFID tags on each bin is a costly and labour intensive process and as a consequence occupies a significant amount of resources of the waste collection company. This is even more disadvantageous in circumstances where such association of bins with users is being retrospectively applied, for example, in circumstances where refuse collection previously did not incur charges and as a result there was no necessity to associate an individual user with their specific refuse bin. In such circumstances each of the users on a route will have their own refuse bins but heretofore in order to implement a new charge based refuse collection system it has been necessary to replace each of the previously provided bins with new bins incorporating the necessary communication devices within the bins. Alternatively communication devices may be retrofitted on the bins.

Therefore there is a need for a waste management system which is operable for associating a plurality of refuse bins to corresponding users during refuse collection therefrom without the need to employ a smart electronics device (eg. RFID tag) on each bin.

SUMMARY

These and other problems are addressed by providing a waste management system which records at least one parameter during refuse collection and compares the recorded parameter against pre-recorded data of registered users.

Accordingly, a first embodiment of the invention provides a waste management system as detailed in claim 1. The invention also relates to a system as detailed in claim 27. The invention further relates to a method as detailed in claim 28. Advantageous embodiments are provided in the dependent claims.

These and other features will be better understood with reference to the followings Figures which are provided to assist in an understanding of the teaching of the invention.

BRIEF DESCRIPTION OF THE DRAWINGS

The present invention will now be described with reference to the accompanying drawings in which.

DETAILED DESCRIPTION OF THE DRAWINGS

Figure 1:
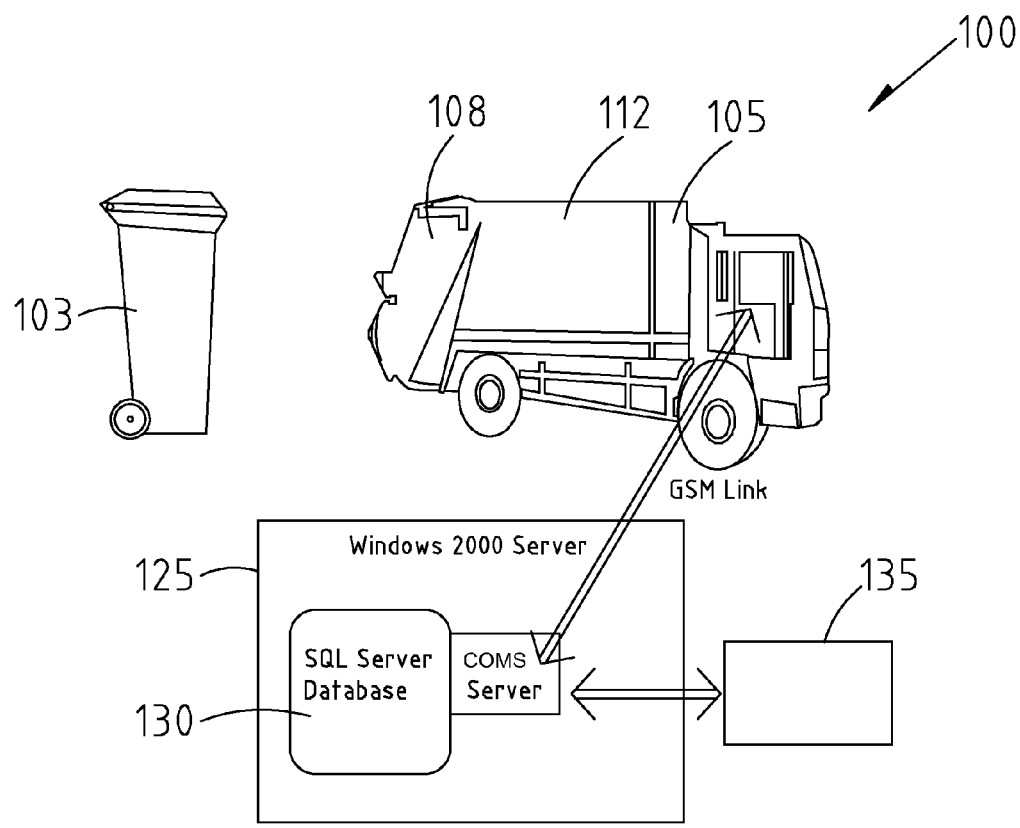
FIG. 1 is a perspective view of a waste management system in accordance with the present invention.
Figure 2:
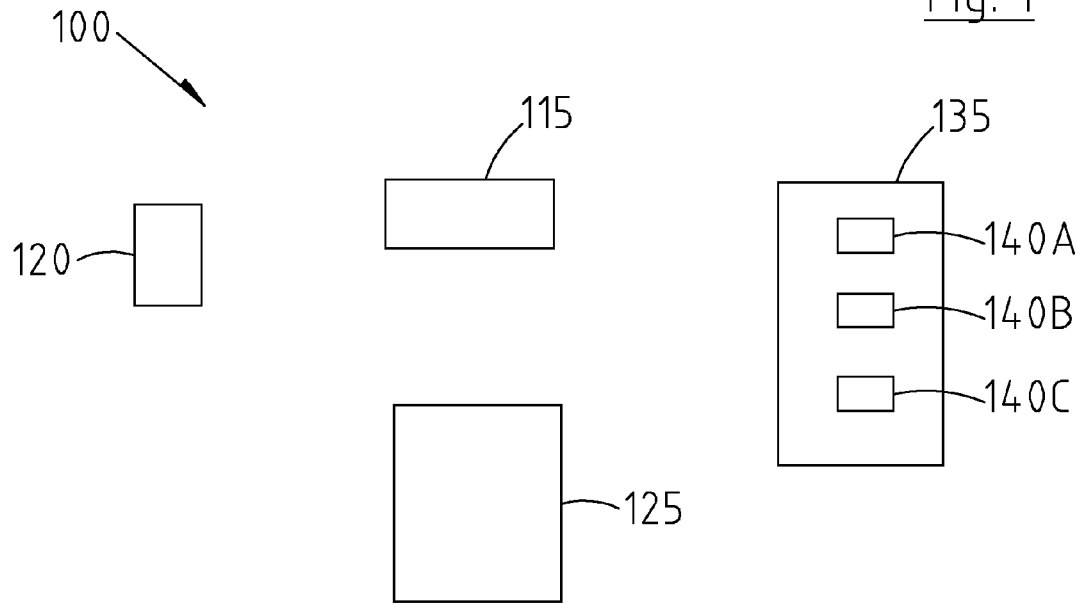
FIG. 2 is block diagram of the waste management system of FIG. 1.

The invention will now be described with reference to an exemplary waste management system which is provided to assist in an understanding of the teaching of the invention and should not be construed as limiting in any fashion.

Referring to the drawings there is provided a waste management system 100 for associating a plurality of bins 103 to corresponding users during refuse collection therefrom. Each of the plurality of bins will typically be associated with a specific registered user. The bins 103 are used for storing refuse and are assigned to registered users by a waste collection company which collects refuse from the bins 103 periodically. Collection vehicles 105 of the type well known in the art follow planned routes when collecting refuse from the bins 103. A lifting mechanism 108 is provided to the rear of the collection vehicle 105 for raising and rotating the bins 103 when discharging the contents of the bins 103 into a container 112 mounted on the chassis of the collection vehicle 105. If the waste management system provides for a charge per weight system, then a weighing mechanism (not shown) may also be provided on the collection vehicle 105 for weighing the bins 103 so as to determine the weight of the refuse contained in the bins 103. In other arrangements the user may only be charged on a per lift basis in which case the weighing system may not be required. A GPS (Global Positioning Satellite) tracker unit 115 is provided on-board the collection vehicle 105 for identifying the actual location of the collection vehicle during its route. This GPS tracker unit 115 may be usefully employed for capturing the actual GPS co-ordinates (parameters) during each lift. In this way, the lifting of a bin 103 may be used to trigger a capture of the GPS coordinates corresponding to the geographic location of the lift. The GPS tracker unit 115 may also provide for a capture of the time information also associated with the individual lifts. In this way each lift of a bin 103 by the refuse collection vehicle 105 resultant from the refuse being collected from the bin 103 by the collection vehicle 105 will be associated with specific geographic identifiers corresponding to the location of the individual lifts.

The GPS tracker unit 115 comprises a GPS receiver which calculates its position by timing the signals sent by a constellation of GPS satellites orbiting the earth. Each GPS satellite continuously transmits microwave signals containing a time stamp. The GPS tracker unit 115 uses the arrival time of each signal to measure the distance to each satellite, from which the GPS tracker unit 115 determines its position. The resulting coordinates are converted to latitude and longitude. The GPS tracker unit 115 employs trilateration when determining its position. Trilateration is a method of determining the relative positions of objects using the geometry of triangles in a similar fashion as triangulation. Trilateration uses the known locations of two or more reference points, and the measured distance between the collection vehicle 105 and each reference point. A communications device 120 is also provided on-board the collection vehicle 105 and is communicable with the GPS tracker unit 115 and where provided the weighing mechanism, such that collection of refuse from the bin 103 effects a generation of a data packet comprising the GPS co-ordinates of the bin 103 and the weight of the refuse contained in the bin 103.

A central server 125 communicates with the communications device 120 provided on each of a plurality of collection vehicles 105 over a wireless channel, for example, a GSM network, such that the GPS co-ordinates of a lifted bin 103 and the weight of the refuse contained therein may be communicated to the server 125. This communication may be provided on a pseudo real time basis such that during the collection route multiple data packets are transmitted from each collection vehicle to the central server. In an alternative arrangement, the communication device may be configured to temporarily store or cache the data corresponding to the lifted bins during the collection route and only effects a transfer of that data to the central server on return of the collection vehicle to its appropriate depot. In either example, the central server 125 includes a datastore, in this case, an SQL database 130 which stores pre-recorded data, in this case, geographical data of the registered users, for example, the GPS co-ordinates of a building associated to each user, or the like. The central server 125 is operable to dynamically compare the GPS co-ordinates of the bin 103 contained in the data packet from the communications device 120 with the static pre-recorded geographical data of each registered user. The central server 125 is operable to score each comparison for determining the probability of its registered user. This is particularly useful in scenarios where the GPS coordinates of a lift do not correspond exactly with the pre-recorded GPS co-ordinates. Using such a statistical arrangement, the GPS co-ordinates of the bin 103 which matches closest to the geographical data of a particular user is given the highest score. The GPS co-ordinates of the bin 103 which matches least with the geographical data of a particular user is given the lowest score.

It is envisioned that the collection vehicle(s) may have the capability of reading RFID tags. A series of other parameters may also be employed together with the GPS co-ordinates of the lifted bins for identifying users. These additional parameters are particularly useful in the event that the bins are not provided with RFID tags, the RFID tags fails or the RFID tag reading equipment fails. These parameters may include data indicating the type of collection vehicle, for example, whether the collection vehicle is assigned to collect domestic refuse or commercial refuse. Alternatively, the parameters may relate to data representing the route followed by the collection vehicle. The parameters may also relate to the characteristics of the bins lifted by the lifting mechanism 108 on the collection vehicle 105. The characteristics of the bins may include the volume/weight of the bins. These additional parameters may be incorporated into an algorithm used to identify the user. The additional parameters may be used when calculating the score or used to eliminate particular bins/users from consideration. For example, bins on a particular route may not be considered, or perhaps a type of customer may be excluded based on whether the customer is a registered domestic user or commercial user. The central server 125 is programmed to associate each bin 103 to a registered user based on the scores. In the case where an RFID tag is installed on the bin, the RFID tag may be used to identify the user and the GPS coordinate can be used as a double-check to ensure that the bin 103 is in an area appropriate to that user. If the bins do not have RFID tags, the GPS co-ordinates of the bin 103 recorded during the lift which scores highest with the geographical data of a particular user is used as the primary identification method. The other parameters may be used to validate the result or perhaps exclude certain users.

Once the bin 103 is associated to a particular user that user is charged appropriately for the refuse collected from that bin. In this way the waste collection company is able to identify the user of each bin 103 and charge the user an appropriate tariff for refuse collection without incorporating intelligent devices on the bins 103. The system 100 is particularly suitable for identifying users of bins in areas which are not densely populated such that users live a relatively far distance apart. For example, in the suburbs of many cities of the United States houses may be spaced apart by a mile or more. The further users live apart from each other reduces the risk of a bin being associated to an incorrect user. The house which is closest to where a bin is lifted by the collection vehicle is associated to the occupier of that house. In a lowly densely populated area, the risk of a bin being lifted equi-distant from two or more houses is remote.

In a first arrangement such charging of the specific users may be effected on a periodic basis—for example quarterly or the like. The user will receive a notification of the number of lifts that occurred during the preceding period and charges appropriate to each lift. On receipt they will then be obliged to transfer funds to the waste collection company to cover those charges. Such an arrangement will be familiar to those skilled in the art.

In an alternative arrangement, on the occasion of each recorded lift for a particular user, the central server 125 generates and forwards an instruction to a remote telecoms operator 135 instructing the telecoms operator 135 to generate a data message appropriate to the details of the refuse collection and to transmit that data message to the user to effect confirmation of collection of the refuse bin 103. The telecoms operator 135 as a result of the instruction from the central server 125 sends the data message to the user via a suitable telecommunications medium, for example, an SMS message, an email, or via some other suitable medium. Desirably the data packet is sent from the collection vehicle 105 to the central server 125 at periodic intervals during the collection route—typically time de-limited—and on receipt the central server 125 effects generation of the instructions to the telecoms operator 135 in a real time fashion. In this way the user will receive the data message confirming the collection of their bin in a time frame relatively concurrent with the actual collection of their bin 103.

The central server 125 is programmed to generate an appropriate tariff for the collection of refuse from the bin 103 based on the weight data contained in the data packet sent to the server 125 from the communications device 120 on-board the vehicle 105. The tariff is defined by the weight of refuse collected. For example, if the refuse collected weighs 10 Kgs the tariff may be €3 and if the refuse collected weighs 20 Kgs the tariff may be €6. When the central server 125 sends the instruction to the remote telecoms operator 135 the instruction includes details of the appropriate tariff. The generation of the data message by the remote telecoms operator 135 effects a deduction of an appropriate tariff from a telecoms billing account associated with the user. This deduction of the tariff may be effected by employing reverse billing such that a user's telecom billing account is debited by an appropriate tariff based on them receiving a data message. Such reverse billing is known in the context of premium text messaging. Premium text messaging is a method of purchasing goods and services and having them billed to a mobile phone account. Conventionally such premium text messaging is based on a user subscription service whereby a user will subscribe for periodic updates which are then sent to the user on a regular periodic interval—such as for example the transmission of new ringtones to the user every month. However in the context of the present teaching such reverse billing is effected on the basis of a third party initiation which may occur on an irregular basis. As the collection of the bin 103 is the initial trigger for the charge, and the weight of the bin 103 is not known a priori to the collection of the bin the actual tariff cannot be hardcoded and changes with each collection.

To address such fluctuations or variances in appropriate charges, the present invention teaches for the remote telecoms operator 135 to comprise a plurality of data message generation modules 140, each differing from one another in the tariff deducted from a user on generation of a data message for that user. The instruction sent from the central server 125 to the remote telecoms operator 135 is provided to an appropriate data message generation module 140 of the remote telecoms operator 135. In this way an appropriate charge can be selected on an individual basis for each bin 103 collection.

In use, the lifting mechanism 108 of the collection vehicle 105 mates with the bin 103 for raising and rotating the bin 103 such that its contents are loaded to the container 112 mounted on the collection vehicle 105. The weighing mechanism on the vehicle 105 weighs the bin 103 for determining the weight of the refuse contained therein. To effect identification of the owner or pre-assigned bin user, the GPS tracker unit 115 records the GPS co-ordinates of the collection vehicle 105 which is stationary as the contents of the bin 103 are being discharged into the container 112. As the collection vehicle 105 has mated with the bin 103 the collection vehicle and the bin 103 will have the same GPS co-ordinates. Thus, the GPS co-ordinates of the bin 103 are recorded by the GPS tracker unit 115 as refuse is being collected therefrom by the collection vehicle 105, the capture of the actual GPS coordinates being triggered by the lifting mechanism 108 of the collection vehicle 105. The communications device 120 on-board the collection vehicle 105 generates a data packet containing the GPS co-ordinates of the bin 103 and the weight of the refuse contained therein. The communications device 120 forwards the data packet to the central server 125 via the GSM network. The server 125 dynamically compares the GPS co-ordinates of the bin 103 contained in the data packet from the communications device 120 with the static pre-recorded geographical data of each registered user. The central server 125 scores each comparison for determining the probability of the bins' user. The central server 125 associates each bin 103 to a registered user based on the scores. The GPS co-ordinates of the bin 103 which scores highest to the geographical data of a particular user is associated to that user. The central server 125 may utilise other parameters such as collection vehicle type, route, and characteristics of the lifted bin when generating the score. Once the bin 103 is associated to a particular user that user is charged appropriately for the refuse collected from that bin 103.

Once the user has been identified the server 125 forwards an instruction to the appropriate data message generation module 140 of the remote telecoms operator 135 instructing the telecoms operator 135 to generate a data message (premium SMS message) notifying the user that his bin 103 has been emptied. The telecoms operator 135 in response to the instruction from the server 125 sends the premium SMS message to the mobile phone of the user. The cost of the premium text message equates to the tariff generated by the central server 125 resulting in an amount corresponding to the tariff being deducted from the user's telecoms billing account.

A user may also be assigned one or more additional bins, such that each user will have a plurality of bins associated with them. For example it is known in many countries for users to have a recycling bin in addition to their normal bin 103. The collection of each of these different types of bins can attract different charges. To address this discrepancy in potential charges, in accordance with an embodiment of the present teaching, the collection vehicle could be provided with an identification module configured to distinguish on a generic level between bins of a first type and those of a second type. For example recycling bins and non-recycling bins are often colour coded so that a user can distinguish between them. In such an arrangement of colour coding an optical detector could be provided adjacent to the lifting mechanism 108 of the collection vehicle, the detector being capable of optically distinguishing between bins of different colours. In this way not only would the lifting mechanism effect a trigger of the capture of the appropriate GPS location for the lift but it would also provide for an identification of the bin type. The collection vehicle may be dedicated to collecting recycling refuse on a particular day or route and general domestic refuse on a different day or route. In some cases the collection vehicle is equipped with alternate lift and storage compartments for dealing with either recycling refuse or general refuse. Information from the vehicle lifting mechanism may be used to distinguish the difference between a recycling bin and a general refuse bin. Only on subsequent association of the GPS locations with preregistered users (as was discussed above) would the system identify the actual owner of the bin, but at that time the system could provide information also on the nature of the refuse collected from that user at that lift. It will be appreciated that an optical detector capable of detection of specific colours is only exemplary of the type of detector that could be provided to distinguish between bins of a first type and those of a second type. Within the context of the present teaching any detector that could operably provide such differentiation could be usefully employed. The on-board communications device 120 is communicable with the optical detector for incorporating the classification of the bin 103 into the data packet prior to submission to the central server 125.

In an effort to encourage users to recycle the system 100 may be employed to implement a bonus scheme where a users' telecom billing account is credited based on amount of refuse recycled compared to the amount of non-recyclable waste collected. In this case, the premium SMS message to the mobile phone of the user would trigger a refund to the users' telecoms account. It will be appreciated by those skilled in the art that the bonus scheme may be implemented in a variety of different ways. The detector may be operable for selectively controlling the lifting mechanism of the collection vehicle such that the lifting mechanism is only permitted to lift bins of a particular type identified by the detector. Typically, recycling bins and non-recycling bins are collected by different collection vehicle in order to keep recyclable refuse apart from non-recyclable refuse. The detector may be employed for filtering the type of bins lifted by the collection vehicle which reduces the risk of non-recyclable refuse contaminating recyclable refuse in the collection vehicle which may occur if the content of a non-recyclable bin is discharged into a collection vehicle assigned for collecting recyclable refuse. The detector will read the colour code of the bins and will only permit the collection vehicle lift bins with a particular colour code.

It will be understood that what has been described herein is an exemplary embodiment of a waste management system for associating a plurality of refuse bins to corresponding users. While the present invention has been described with reference to some exemplary arrangements it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

Similarly the words comprises/comprising when used in the specification are used to specify the presence of stated features, integers, steps or components but do not preclude the presence or addition of one or more additional features, integers, steps, components or groups thereof.

What is claimed is:

1. A waste management system for associating a collected refuse bin with a corresponding user of that bin:
    the system comprising:
    a GPS tracker unit on-board a collection vehicle for recording GPS co-ordinates of each refuse bin during refuse collection therefrom by the collection vehicle, the GPS co-ordinates being stored in a datastore associated with the GPS tracker unit, the capture of the GPS coordinates being triggered by a lifting mechanism of the collection vehicle;
    a central server configured for communication with each of a plurality of collection vehicles so that the GPS co-ordinates of each refuse bin collected during a refuse collection and stored in a respective datastore may be communicated to the central server using one or more data packets from each of the plurality of collection vehicles,
    the central server being further configured to effect a datastore lookup for comparing the GPS co-ordinates of the collected refuse bins from the received data packets with a datastore having pre-recorded geographical data of a plurality of users for associating each refuse bin to a corresponding user, wherein the central server is operable to:
        dynamically compare the GPS co-ordinates of the collected refuse bin contained in the data packet with the pre-recorded geographical data of each of the plurality of users,
        score each comparison to statistically determine a correct corresponding user for each collected refuse bin based on a probability determination, wherein the GPS co-ordinates of the refuse bin which matches closest to the pre-recorded geographical data of a particular user is given the highest score and the GPS co-ordinates of the refuse bin which matches least with the pre-recorded geographical data of a particular user is given the lowest score,
        associate the refuse bins to corresponding users based on the scores, whereby the probability statistics based on location provide a unique result for each combination of user and the GPS coordinates of the collected refuse bin,
    the central server being further configured to use at least one other parameter other than the GPS co-ordinates for:
        (a) eliminating particular users from consideration, and
        (b) validating the result of matching the GPS co-ordinates with the pre-recorded geographical data.

2. The waste management system as claimed in claim 1, wherein the system further comprises an on-board communications device being communicable with the GPS tracker unit for generating the data packet including the GPS co-ordinates of the respective refuse bin.

3. The waste management system as claimed in claim 2, wherein the on-board communications device is communicable with a weighing mechanism for incorporating into the data packet the weight of the refuse collected from the respective refuse bin at the corresponding GPS co-ordinates.

4. The waste management system as claimed in claim 2 further comprising a detector configured to identify the classification of the refuse bin being collected, the classification of the respective refuse bin being provided into the data packet.

5. The waste management system as claimed in claim 4 wherein the detector is an optical detector configured to identify the colour of the respective refuse bin.

6. The waste management system as claimed in claim 2, wherein the on-board communications device is communicable with the central server for communicating the data packet to the central server.

7. The waste management system as claimed in claim 6, wherein the on-board communications device communicates with the central server over a wireless communications channel.

8. The waste management system as claimed in claim 1, wherein the central server is further configured to effect generation of an instruction to a remote telecoms operator to generate a data message appropriate to the details of the refuse collection and to transmit that data message to the user to effect confirmation of collection of the refuse bin.

9. The waste management system as claimed in claim 8, wherein the central server is configured to effect generation of an appropriate tariff for the collection of the refuse bin.

10. The waste management system as claimed in claim 9, wherein the tariff is defined by the weight of refuse collected.

11. The waste management system as claimed in claim 9, wherein the central server is configured to send an instruction which includes the appropriate tariff to the remote telecoms operator.

12. The waste management system as claimed in claim 9, wherein the data message transmitted to the user includes details of the tariff.

13. The waste management system as claimed in claim 9, wherein the generation of the data message by the remote telecoms operator effects a deduction of the appropriate tariff from a telecoms billing account associated with the user.

14. The waste management system as claimed in claim 9, wherein the appropriate tariff is related to the specifics of the refuse collection.

15. The waste management system as claimed in claim 9, wherein the instruction to the remote telecoms operator is provided to an appropriate data message generation module of the remote telecoms operator, the remote telecoms operator including a plurality of data message generation modules differing from one another in the tariff deducted from a user on generation of a data message for that user.

16. The waste management system as claimed in claim 1, wherein the GPS tracker unit is communicable with a constellation of GPS satellites orbiting the earth.

17. The waste management system as claimed in claim 1, wherein the GPS tracker unit uses trilateration when recording the GPS co-ordinates of the respective refuse bins.

18. The waste management system as claimed in claim 1, wherein the scores are derived from the GPS co-ordinates and at least one parameter other than the GPS co-ordinates.

* * * * *